Figure 1:
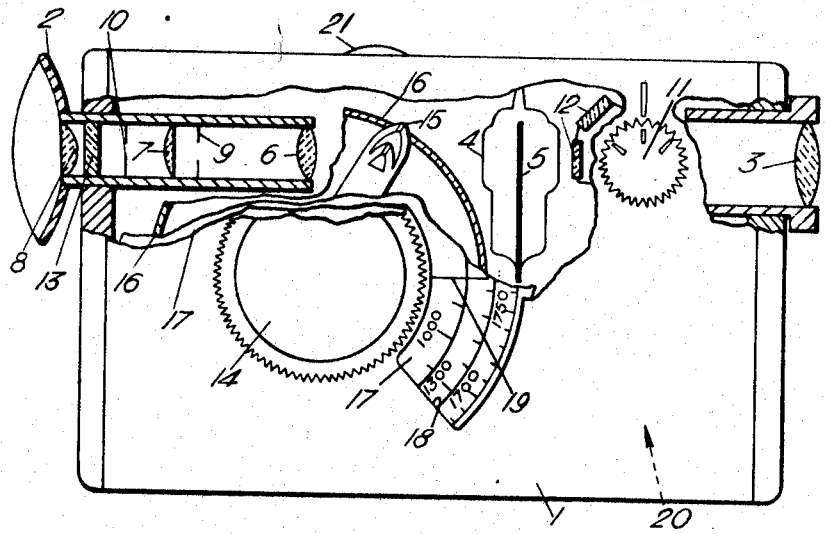

July 16, 1968

T. LAND 3,392,625

CURRENT CONTROL CIRCUIT FOR A DISAPPEARING
FILAMENT TYPE OPTICAL PYROMETER

Filed Nov. 23, 1964

Inventor
Thomas Land

By Watson, Cole, Grindle & Watson
Attorneys

United States Patent Office 3,392,625
Patented July 16, 1968

3,392,625
CURRENT CONTROL CIRCUIT FOR A DISAPPEARING FILAMENT TYPE OPTICAL PYROMETER
Thomas Land, Dronfield, Sheffield, England, assignor to Land Pyrometers Limited
Filed Nov. 23, 1964, Ser. No. 413,152
8 Claims. (Cl. 88—22.5)

This invention relates to optical disappearing filament pyrometers, i.e., of the type in which the brightness of an image of a body heated to luminosity is compared with the brightness of a filament, e.g., a tungsten filament lamp, heated by the passage of an electric current and located in a plane in which the image is formed by the objective lens of a telescope. With a filter, usually red, incorporated in the eyepiece of the telescope to ensure that there will be no difference of colour between the hot body and the filament, heating of the filament to the same brightness as the image causes the filament to be no longer distinguishable from the image. Hence, with such a disappearing filament optical pyrometer, the brightness temperature to be measured is ascertainable from the current or the voltage across the filament, or the resistance of the filament, when the current through the filament has been brought to the value required to produce the disappearing amount of brightness.

A deflectional galvanometer is often used to measure the current through the filament or the voltage across the lamp and so to indicate the brightness temperature of the filament on a scale marked in temperature. Although this arrangement is convenient in that the temperature can be read at once from the pointer and scale, the accuracy is not very high, and the galvanometer is rather bulky and is easily damaged under industrial conditions.

When greater accuracy is needed it is usual to substitute a null-balance system for the deflectional galvanometer. This can lead to a heavy and bulky system and an even more delicate galvanometer is needed to give adequate precision. Furthermore, when a null-balance system is adopted, two balancing operations are needed every time a measurement is made: first the lamp current is adjusted until the filament disappears, and then the null-balance circuit is adjusted to give the correct temperature reading on the scale. Thus accuracy is obtained at the expense of convenience of operation.

The object of the invention is to provide a simple and conveniently and rapidly operable means of supplying and measuring the current to the filament, particularly with a view to providing a compact and light instrument of adequate accuracy, yet rugged enough to withstand industrial use.

According to the present invention, a disappearing filament optical pyrometer comprises a current supplying and measuring circuit consisting of a current supplying unit, a current stabilising unit fed by the supplying unit, and a current dividing unit fed by the stabilising unit, the current supplying unit consisting of a voltage source together with a switch, the current stabilising unit being adapted to give a substantially constant output current over a wide range of voltages fed to it, and substantially independent of the resistance of the current dividing unit fed by it, and the current dividing unit comprising a two-limb circuit, the filament of the pyrometer lamp being connected in one limb, and a fixed resistor being connected in the other limb, and the limbs having a junction that forms one point of connection to the current stabilising unit, the other point of connection being provided by a sliding contact, there being a resistor, over which the sliding contact is adjustably movable, connected between the ends of the filament and the resistor in the said limbs remote from the said junction, together with a scale on which can be read the position to which the sliding contact is moved.

As will be explained below, semi-conductor devices (diodes and transistors) in association with appropriate resistors form the basis of the current stabilising unit that feeds the current dividing unit with constant current.

With voltage supplied, conveniently by a battery incorporated in the pyrometer, by the supplying unit to the stabilising unit, closing of the switch causes the total current from the battery to be split into the limbs of the current dividing circuit, and the filament to be heated to an extent dependent upon the position of the sliding contact along the resistor. The total current being maintained at constant value by the constant current unit, unaffected by minor variations in the supply voltage (as by partial discharge or temperature variation) or in the resistance of the entire circuit, the current through the filament is determinned uniquely by the position of the sliding contact, and that position is itself a measure of the current passing when adjustment of the contact has brought the filament to disappearing brightness.

Small changes in contact resistance at the sliding contact do not affect either the current through the filament, because the stabilising unit maintains the total current constant, or the proportion of the total current through the filament, because that proportion is determined solely by the ratio of the resistance of the two limbs of the current dividing circuit.

By calibration of the scale in terms of temperature, the desired reading of the temperature of the hot body under observation is obtained directly from the position to which the sliding contact has been adjusted. Thus, the resistor may be toroidally wound in a conventional manner, the position of the sliding contact then being shown along a correspondingly arcuate scale. Since most usually in such a resistor the resistance varies uniformly along its length, the temperature scale will not be uniformly divided. However, the uniformity of this scale can be improved by winding the resistor on a tapered former so that equal increments of resistance occupy varying lengths on the former.

Preferably, the current stabilising unit comprises two Zener diodes, each with a series resistor, connected in cascade, and a transistor connected as an emitter follower, the first diode and its resistor being connected to the current supplying unit, the second diode and its resistor being connected across the first diode, the junction of the second diode and its resistor being connected to the base of the transistor, and a resistor being connected between the emitter of the transistor and the common connection of the two diodes, the current dividing circuit being connected between the collector of the transistor and the junction of the current supplying unit and ₊ne resistor of the first diode.

A constant current unit of the type in question will supply a constant current only if the battery voltage remains within a certain range of values, for example between 7 and 9 volts. It is therefore necessary to incorporate in the pyrometer some means of checking that the battery voltage is not too low. This can be done by means of a voltage indicator, e.g., a miniature voltmeter, or more accurately by means of a small milliammeter in series with a Zener diode (which can conveniently be the Zener diode connected to the current supplying circuit), the critical voltage of the diode being a little less than the lowest acceptable voltage of the battery. The milliammeter can be replaced by an indicator lamp which glows if the battery voltage is above the lowest acceptable value, provided the lamp is located in some recess where its visibility is not influenced by the conditions of the surrounding general illumination. The voltage indicator need not be calibrated in volts or amperes:

it need only have a division into two regions indicating the battery voltage to be either sufficient or too low, so that the battery can be replaced or recharged before it is in danger of causing incorrect readings.

It is also advantageous, for the further stabilisation of the current, for a resistor to be connected between the emitter of the transistor and the junction of the resistor of the first diode and the current supplying unit.

Figure 2:
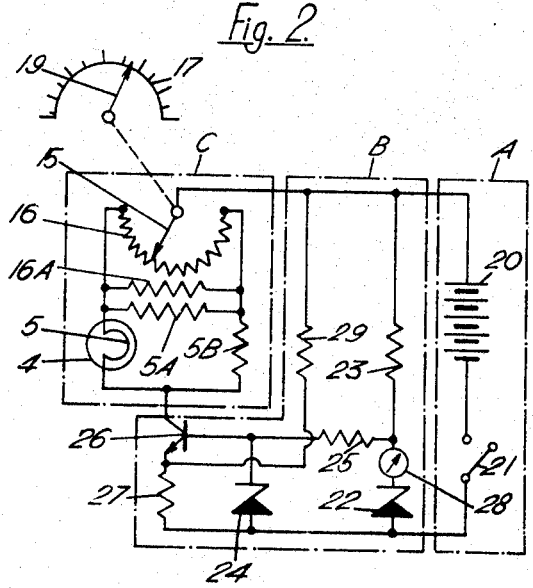

An embodiment of the invention will now be described with reference to the accompanying drawings, in which:

FIGURE 1 is a side view of a portable self-contained disappearing filament optical pyrometer, partly broken away to display internal elements; and FIGURE 2 is a diagram of a preferred circuit, typical values of the components of which are given by way of example below.

In FIGURE 1, a pyrometer that may be made of a size suitable for carrying in the pocket, and robust enough to be carried in that manner, comprises a flat case 1, across the top portion of which is a sighting line between an eyepiece 2 and an objective lens 3 to be directed at the object the temperature of which is to be ascertained. Either or both of the items 2, 3 may be adjustable for focussing in the well-known manner. A lamp 4, having its filament 5 in the line of sight, is observed—against the illumination seen through the lens 3—by means of an erecting lens 6 and two eyepiece lenses 7, 8, together with an aperture stop 9 and a field stop 10. The intensity of illumination from the lens 3 may be controlled by a small three-position range knob 11, by means of which either or none of two neutral filters 12 may be interposed in front of the filament 5. A red filter 13 is disposed near to the eyepiece 2.

A larger knob 14 adjusts the position of a sliding contact 15 along a toroidally wound resistor 16 ohm 16. A scale 17 moves with the knob 14 and is visible through an opening 18 crossed by a fiduciary line 19, against which can be read the position reached on any of several scale-markings on the scale, covering different temperature ranges. A battery 20 is contained inside the case 1.

In FIGURE 2, for simplicity, the scale 17 is indicated as stationary, and instead a pointer 19 that is the equivalent of the fiduciary line in FIGURE 1 is shown partaking of the movement of the sliding contact 15 along the resistor 16, the resistor 16 forming part of a current dividing unit C in the pyrometer circuit. The circuit includes a current supplying unit A and a current stabilishing unit B.

The current supplying unit A simply consists of the battery 20, of the cadmium nickel type, having a nominal voltage of 7.2 volt, and a switch 21 (also seen at the top of FIGURE 1).

The current stabilising unit B consists of a first Zener diode 22, critical voltage 5.6 volt, in series with a 39 ohm resistor 23, with a second Zener diode 24, critical voltage 3.3 volt, and a series resistor 25 of 150 ohm in cascade. The junction of 24 and 25 is connected to the base of a transistor 26, the emitter of which is connected through a 40 ohm resistor 27 to the common connection of the two diodes 22, 24. The collector of the transistor 26 forms one connection between the unit B and the unit C, the sliding contact 15 providing the other connection.

The critical voltage of the first Zener diode 22 is a little below the minimum acceptable voltage of the battery 20, which voltage is indicated by a low-resistance (say 1 ohm) milliammeter 28 in series with the diode 22. In addition to their function, in conjunction with the Zener diode 24 and the resistor 25, of feeding the current dividing unit C with constant current, the Zener diode 22 and the resistor 23 provide a sensitive indication of the voltage of the battery, readable on the milliammeter 28 in series with them. Alternatively, instead of the milliammeter, there could be used an indicator lamp, suitably shielded against the surrounding general illumination, that glows only if the battery voltage is above the lowest acceptable value.

The precision of the current stabilisation is further enhanced by a 2000 ohm resistor 29 shunted across the connection of the unit B to the sliding contact 15 and the connection of the resistor 27 to the emitter of the transistor 26. The transistor is connected as an emitter follower maintaining a constant collector current, the value of which depends on the critical voltage of the second Zener diode 24 and the value of the resistor 27. As the voltage of the battery 20 falls, the voltage across the diode 24 will fall a very small amount, and the resistance of the resistor 29 is chosen so that the voltage across the resistor 27 falls by exactly the same amount, the collector current therefore remaining exactly constant.

A 500 ohm resistance 16A is connected as a shunt across the slidewire resistance 16 to trim the resistance of the individual slidewire to a value standardised for all pyrometers of the same design. A 120 ohm resistor 5A and a 25 ohm resistor 5B in series with the filament 5 preferably form with the lamp 4 a standardised interchangeable lamp unit suitable for any of the standardised pyrometers, the values of the resistances being so chosen that any pyrometer fitted with the unit reads exactly the correct temperature at two selected temperatures adjacent to the two ends of the temperature scale 17.

As the position of the sliding contact 15 along the resistor 16 is varied until the filament 5 as viewed at the eyepiece 2 disappears, the total constant current passing through the contact 15 is split in proportions depending uniquely on the position reached, which position therefore enables the temperature of the hot body under observation to be seen as the reading of the fiduciary line 19 at one or other of the temperature markings of the scale 17 movable with the contact 15.

What I claim is:

1. A disappearing filament optical pyrometer, comprising a current supplying and measuring circuit consisting of a current supplying unit, a current stabilising unit fed by the supplying unit, and a current dividing unit fed by the stabilising unit, the current supplying unit consisting of a voltage source together with a switch, the current stabilising unit being adapted to give a substantially constant output current over a wide range of voltages fed to it, and substantially independent of the resistance of the current dividing unit fed by it, and the current dividing unit comprising a two-limb circuit, the filament of the pyrometer lamp being connected in one limb, and a fixed resistor being connected in the other limb, and the limbs having a junction that forms one point of connection to the current stabilising unit, the other point of connection being provided by a sliding contact, there being a resistor, over which the sliding contact is adjustably movable, connected between the ends of the filament and the resistor in the said limbs remote from the said junction, together with a scale on which can be read the position to which the sliding contact is moved.

2. A pyrometer as in claim 1, comprising in the current stabilising unit means for indicating the condition of the voltage source of the current supplying unit.

3. A pyrometer as in claim 2, comprising a milliammeter as the means for indicating the condition of the voltage source.

4. A pyrometer as in claim 1, comprising a standardising resistance shunted across the resistor over which the sliding contact moves in the current dividing unit.

5. A pyrometer as in claim 1, comprising two standardising resistances in series with the filament of the lamp.

6. A disappearing filament optical pyrometer, comprising a current supplying and measuring circuit consisting of a current supplying unit, a current stabilising unit fed by the supplying unit, and a current dividing unit fed by the stabilising unit, the current supplying unit consisting of a voltage source together with a switch, the current stabilising unit being adapted to give a substantially constant output current over a wide range of voltages fed to it, and substantially independent of the resistance of the current dividing unit fed by it, the current dividing unit comprising a two-limb circuit, the filament of the pyrometer lamp being connected in one limb, and a fixed resistor being connected in the other limb, and the limbs having a junction that forms one point of connection to the current stabilising unit, the other point of connection being provided by a sliding contact, there being a resistor, over which the sliding contact is adjustably movable, connected between the ends of the filament and the resistor in the said limbs remote from the said junction, together with a scale on which can be read the position to which the sliding contact is moved, and the current stabilising unit comprising two Zener diodes, each with a series resistor, connected in cascade, and a transistor connected as an emitter follower, the first diode and its resistor being connected to the current supplying unit, the second diode and its resistor being connected across the first diode, the junction of the second diode and its resistor being connected to the base of the transistor and a resistor being connected between the emitter of the transistor and the common connection of the two diodes, the current dividing unit being connected between the collector of the transistor and the junction of the current supplying unit and the resistor of the first diode.

7. A pyrometer as in claim 6, wherein a resistor is connected between the emitter of transistor and the junction of the resistor of the first diode and the current supplying unit.

8. A self-contained portable disappearing filament optical pyrometer comprising a case carrying an objective lens and an eyepiece, a lamp having a filament disposed in a sighting line between the lens and the eyepiece, and a battery for the illumination of the lamp filament contained within the case, together with a current supplying and measuring circuit consisting of a current supplying unit, a current stabilizing unit fed by the supplying unit, and a current dividing unit fed by the stabilising unit, the current supplying unit consisting of the battery together with a switch, the current stabilising unit being adapted to give a substantially constant output current over a wide range of voltages fed to it, and substantially independent of the resistance of the current dividing unit fed by it, and the current dividing unit comprising a two-limb circuit, the filament of the pyrometer lamp being connected in one limb, and a fixed resistor being connected in the other limb, and the limbs having a junction that forms one point of connection to the current stabilising unit, the other point of connection being provided by a sliding contact, there being a resistor, over which the sliding contact is adjustably movable, connected between the ends of the filament and the resistor in the said limbs remote from the said junction, together with a scale on which can be read the position to which the sliding contact is moved, and a knob connected to the sliding contact for the adjustment thereof.

No references cited.

JEWELL H. PEDERSEN, *Primary Examiner.*

E. BAUER, *Assistant Examiner.*